United States Patent [19]

Ono

[11] Patent Number: 5,673,032

[45] Date of Patent: Sep. 30, 1997

[54] SELECTIVE CALLING RECEIVER FOR COMPUTING DEVICES

[75] Inventor: Hiroshi Ono, Tokyo, Japan

[73] Assignee: NEC Corporation, Tokyo, Japan

[21] Appl. No.: 381,237

[22] Filed: Jan. 31, 1995

[30] Foreign Application Priority Data

Jan. 31, 1994 [JP] Japan .................................. 6-027484

[51] Int. Cl.⁶ .................................................. H04Q 7/18
[52] U.S. Cl. ............................. 340/825.44; 340/825.34; 340/311.1; 455/38.2; 395/188.01
[58] Field of Search ..................... 340/825.07, 825.31, 340/825.34, 825.44, 825.42, 311.1; 345/168; 375/316; 455/38.2; 395/188.01

[56] References Cited

U.S. PATENT DOCUMENTS

| | | | |
|---|---|---|---|
| 4,688,036 | 8/1987 | Hirano et al. | 340/825.31 X |
| 4,719,460 | 1/1988 | Takeuchi et al. | 340/825.31 |
| 5,043,721 | 8/1991 | May | 340/825.44 |
| 5,086,298 | 2/1992 | Katsu et al. | 340/825.72 |
| 5,151,694 | 9/1992 | Yamasaki | 340/825.44 |
| 5,281,962 | 1/1994 | Vanden Heuvel et al. | 340/825.44 |
| 5,319,487 | 6/1994 | Sato et al. | 340/825.72 |
| 5,373,289 | 12/1994 | Ichinohe | 340/825.31 |
| 5,377,269 | 12/1994 | Heptig et al. | 340/825.34 |
| 5,387,904 | 2/1995 | Takada | 340/825.44 |
| 5,512,886 | 4/1996 | Macko et al. | 340/825.07 |

FOREIGN PATENT DOCUMENTS

| | | |
|---|---|---|
| 2705010 | 11/1994 | France . |
| 4123206 | 1/1993 | Germany .................. 340/825.72 |
| 4200198 | 7/1992 | Japan . |
| 5346894 | 12/1993 | Japan . |
| 2228595 | 8/1980 | United Kingdom . |
| 9013213 | 11/1990 | United Kingdom . |

*Primary Examiner*—Michael Horabik
*Assistant Examiner*—William H. Wilson, Jr.
*Attorney, Agent, or Firm*—Sughrue, Mion, Zinn, Macpeak & Seas, PLLC

[57] ABSTRACT

A selective calling receiver connectable to a computing device which is capable of reading or writing information particular to the receiver. An external signal transmission device is provided independently of the computing device and sends an optical signal (code) to the receiver. The receiver receives the optical signal with a light-sensitive section thereof and compares it with a code assigned to the receiver. Only if the two codes are identical with each other, the receiver allows the computing device to access it. Therefore, the information particular to the receiver cannot be written to or read out of the receiver without the external signal transmission device.

1 Claim, 5 Drawing Sheets

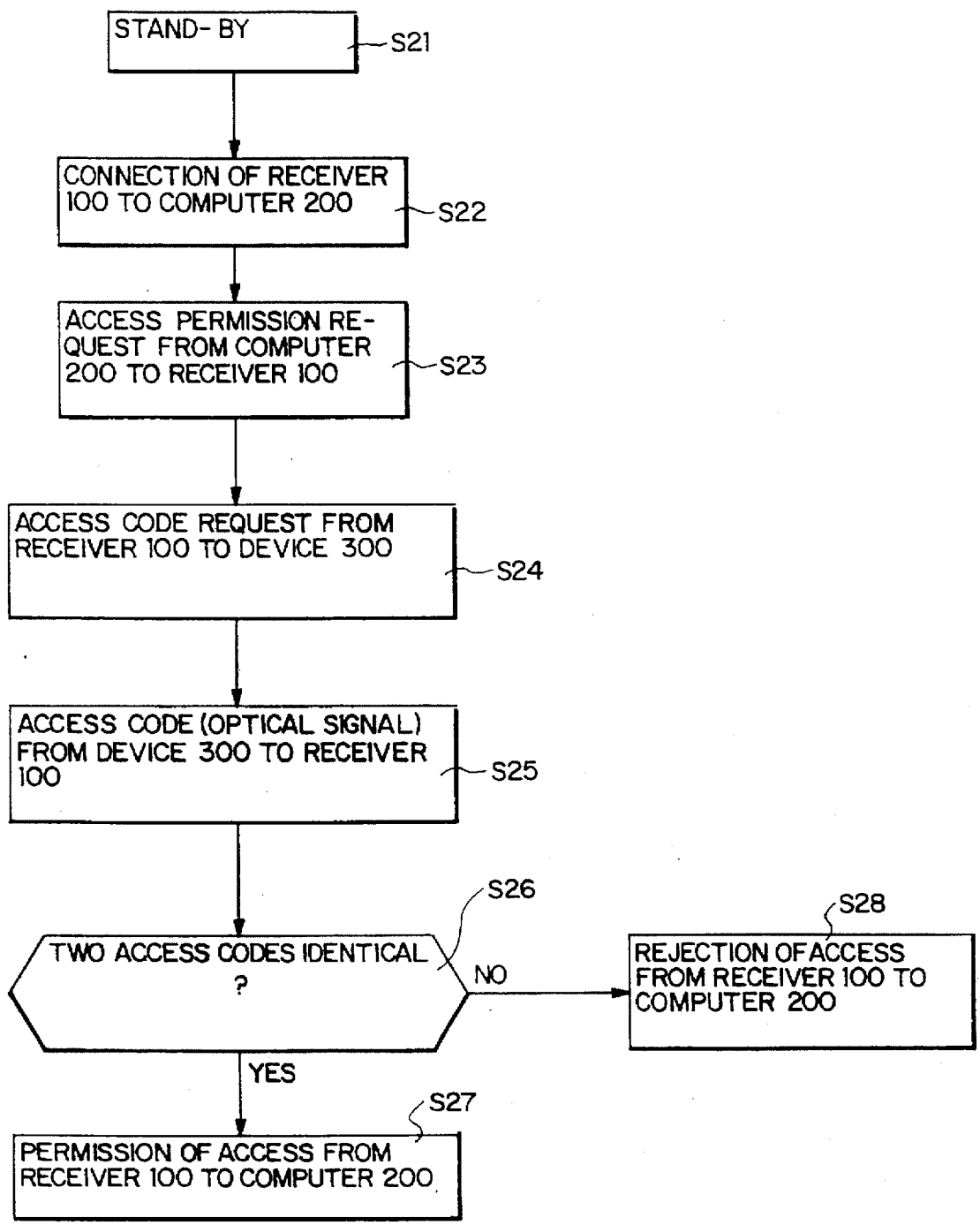

SELECTIVE CALLING RECEIVER FOR COMPUTING DEVICES

BACKGROUND OF THE INVENTION

The present invention relates to a selective calling receiver connectable to a computing device and more particularly, to a selective calling receiver capable of interchanging information particular thereto with a computing device.

A selective calling receiver, or simply receiver as referred to hereinafter, capable of transferring data received over a radio channel to a computing device is taught in, for example, U.S. Pat. No. 5,043,721. The receiver disclosed in this U.S. Patent includes a board on which are mounted a receiving circuit for receiving page signals and a microprocessor for identifying and decoding a page signal intended for the receiver. The board includes connectors for inserting the receiver into a port of a portable computing device. The computing device is programmed to compare information in its memory. For example, it can compare a received phone number against a list of phone numbers to identify the person to be called in response to the page.

When the conventional receiver of the type described and the computing device are allowed to access each other, the receiver is capable of transferring data received over a radio channel to the computing device. At the same time, the receiver and computing device are capable of transferring information particular to the receiver, e.g., address number and functions and operation parameters to each other. This is because the computing device is so constructed as to write or rewrite the information particular to the receiver via the same interface as the received data. However, this function available with the computing device is problematic in that any person, obtained program software particular to the receiver and found an access code, can change the information particular to the receiver.

Originally, the information particular to the receiver should be secured from persons other than, for example, salesmen selling such receivers and exclusive agents authorized by radio businesses. Therefore, the easy access to this kind of information in the event of data transfer between the receiver and the computing device is not desirable from the security standpoint. Assume that such information is not secured from a third or unauthorized person. Then, it is likely that a person detects information particular to another person's receiver, substitutes the detected information for information particular to his own receiver, receives data intended for the another person's receiver, and transfers the received data to a computing device.

SUMMARY OF THE INVENTION

It is, therefore, an object of the present invention to provide a selective calling receiver having a security feature against accesses from a computing device to information particular thereto.

It is another object of the present invention to provide a selective calling receiver which prevents a computing device from accessing it unless an external signal transmission device independent of the computing device is used, thereby eliminating improper reading and writing of information using a computing device.

It is a further object of the present invention to provide a selective calling receiver which is secured from improper accesses by an external signal transmission device which replaces conventional electric connectors additionally provided on a receiver.

A selective calling receiver connectable to a computing device of the present invention has a storage for storing received data when a call meant for the receiver is received. A transferring device transfers, when the receiver is connected to the computing device, the received data to the computing device. A controller allows the transferring device to transfer the received data to the computing device when a particular code is input. A receiving device receives a code sent from an external signal transmission device independent of the computing device, the code being input to the controller.

BRIEF DESCRIPTION OF THE DRAWINGS

The above and other objects, features and advantages of the present invention will become apparent from the following detailed description when taken with the accompanying drawings in which:

FIG. 5 is a flowchart showing an access to a receiver included in the alternative embodiment.

DETAILED DESCRIPTION OF THE PREFERRED EMBODIMENTS

Figure 1:
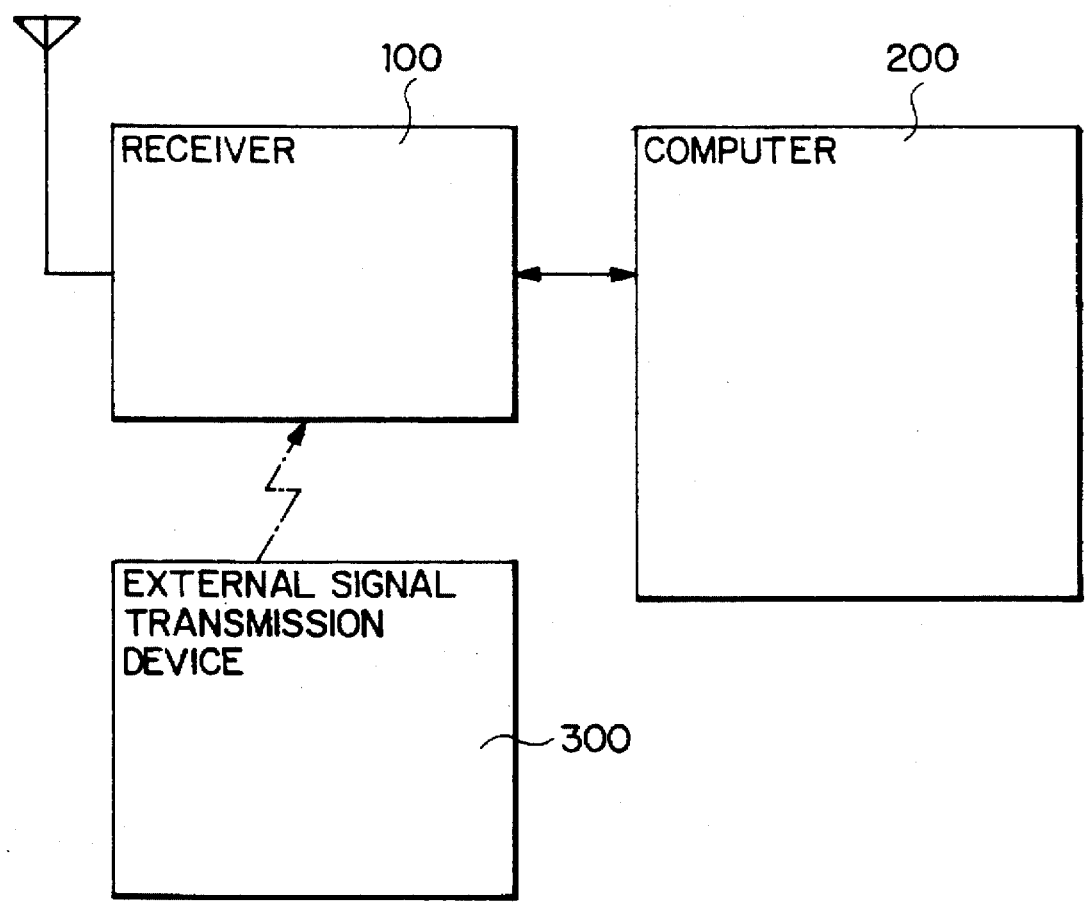
FIG. 1 is a block diagram schematically showing the general arrangement of a selective calling receiver in accordance with the present invention.

Referring to FIG. 1 of the drawings, a selective calling receiver in accordance with the present invention comprises a receiver 100, a computing device, or simply computer as referred to hereinafter, 200, and an external signal transmission device 300. The present invention does not allow data to be interchanged between the receiver 100 and the computer 200 unless the external signal transmission device independent of the computer 300 is used.

Figure 2:
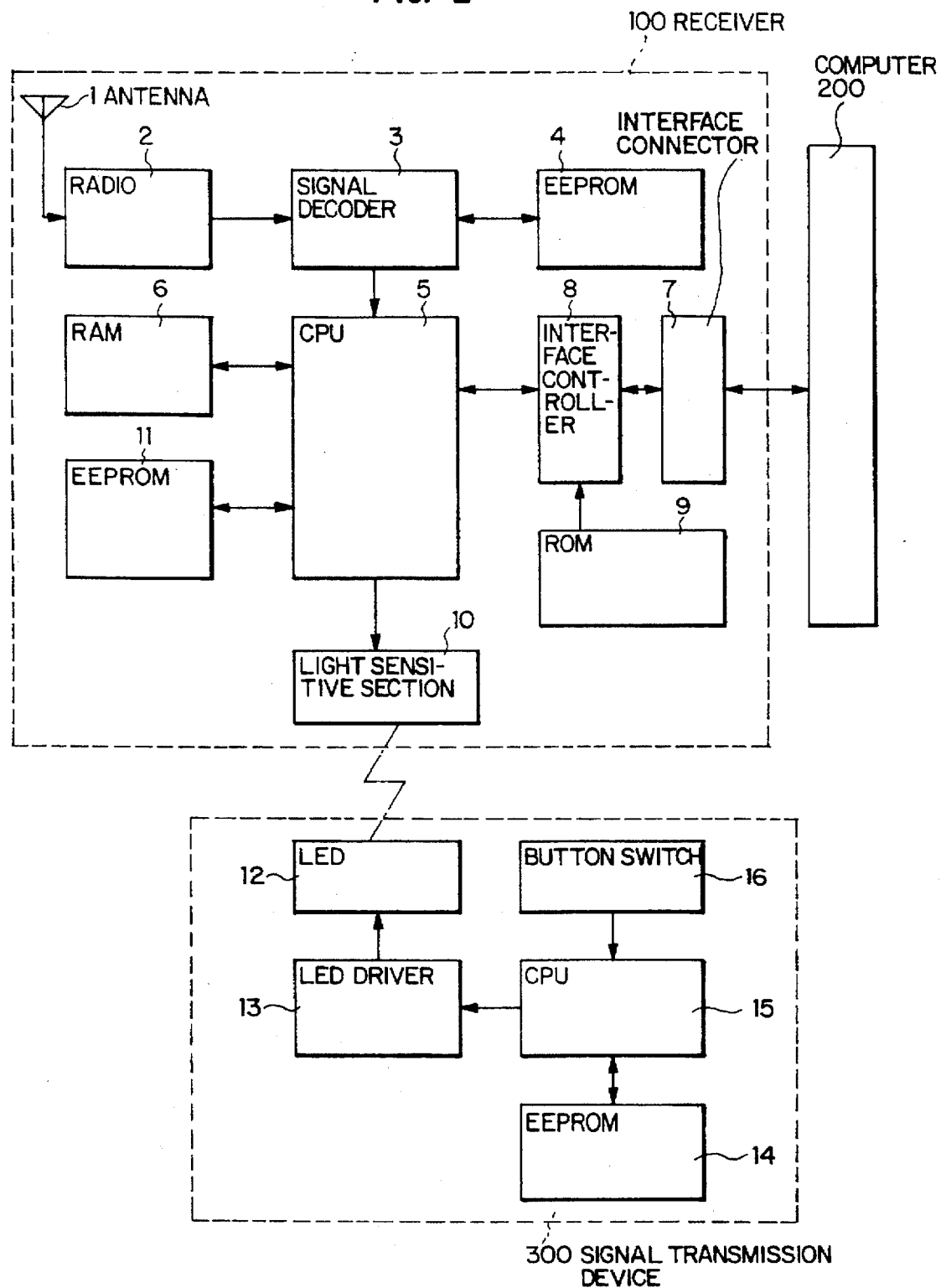
FIG. 2 is a schematic block diagram showing a receiver and an external signal transmission device representing a preferred embodiment of the present invention.

FIG. 2 shows the receiver 100, computer 200 and signal transmission device 300 representing a first embodiment of the present invention specifically. The receiver 100 includes a receiving system having an antenna 1. A page signal coming in through the antenna 1 is applied to a radio section 2 and demodulated thereby. A signal decoder 3 decodes the demodulated signal and compares the resulting signal with an address number assigned to the receiver 100, thereby determining whether or not received data is meant for the receiver 100. An EEPROM (Electrically Erasable Programmable Read Only Memory) 4 stores at least one address number assigned to the receiver 100. When the call is meant for the receiver 100, a CPU (Central Processing Unit) 5 processes data included in the page signal. A RAM (Random Access Memory) 6 is used to store data received and meant for the receiver 100. The receiver 100 is connected to the computer 200 by an interface connector 7, an interface controller 8 for controlling the interface between the receiver 100 and the computer 200, and a ROM 9. The interface controller 8 accesses the ROM 9 to read control data thereoutof.

Further, the receiver 100 has a security feature implemented by a light-sensitive section 10 and an EEPROM 11. The light-sensitive section 10 is comprised of, for example, a photodiode and sensitive to an optical signal sent from the external signal transmission device 300. The EEPROM 11 stores an access permission code to be compared with the optical signal input to the light-sensitive section 10.

The external signal transmission device 300 includes an LED (Light Emitting Diode), or light emitting device for optical transmission, 12. An EEPROM 14 stores an access permission code for optical transmission. A CPU 15 transforms the data read out of the EEPROM 14 to a signal matching an LED driver 13. A button switch 16 is operated to trigger optical transmission.

The operation of the receiver 100 is as follows. A page signal coming in through the antenna 1 is applied to the signal decoder 3 via the radio section 2. The signal decoder 3 decodes an address number included in the page signal and compares it with the address number stored in the EEPROM 4, as in a conventional receiver. If the received address number is identical with the stored address number, the CPU 5 alerts a person to the incoming call via alerting means, not shown. At the same time, the CPU 5 writes data also included in the page signal in the RAM 6. When the receiver 100 is connected to the computer 200, the interface controller 8 allows, based on the interface control signal stored in the ROM 9, the receiver 100 and computer 200 to interchange data via the interface connector 7.

Figure 3:
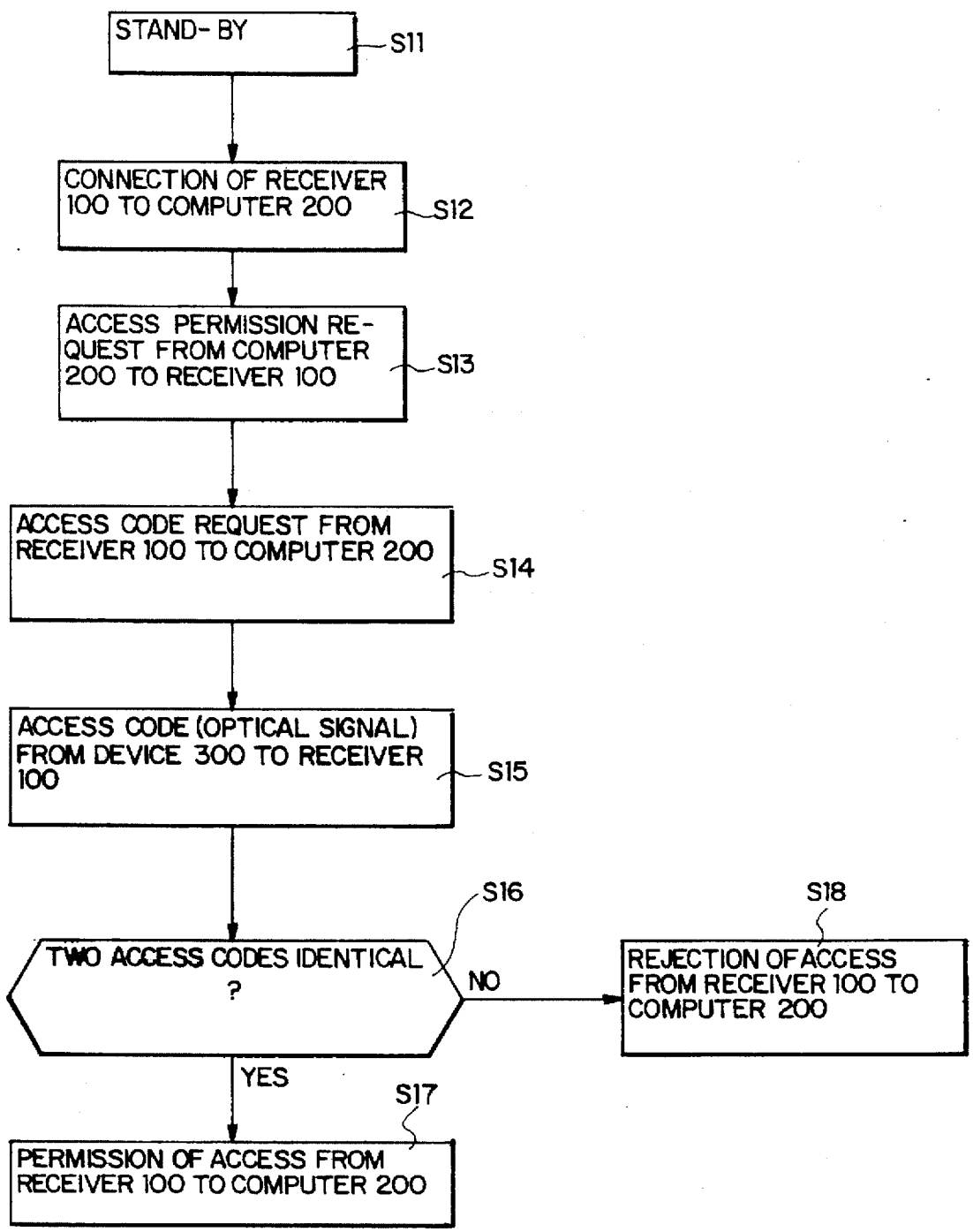
FIG. 3 is a flowchart demonstrating an access to the receiver shown in FIG. 2.

A reference will be made to FIG. 3 for describing the interchange of signals between the receiver 100 and the computer 200. Assume that the receiver 100 in a stand-by state (step S11 is connected to the computer 200 (step S12). Then, the computer 200 sends an access permission request to the receiver 100 (step S13). In response, the receiver 100 requests the computer 200 to send an access code thereto (step S14). On receiving this request from the receiver 100, the computer 200 displays the request and thereby informs the person of the request. Then, the operator presses the button switch 16 provided on the signal transmission device 300 which is separate from the computer 200. The CPU 15 drives, in response to the input from the button switch 16, the LED driver 13 on the basis of the access code stored in the EEPROM 14. The LED driver 13 drives the LED 12 by optical modulation with the result that an optical signal is sent from the LED 12 to the light-sensitive section 10 of the receiver 100 (step S15). In the receiver 100, the CPU 5 transforms the received optical signal to an electric signal and compares a code represented by the electric signal with the access permission code stored in the EEPROM 11 (step S16). If they are identical with each other, the receiver 100 sends an access permission code to the computer 200. As a result, the receiver 100 and computer 200 are enabled to interchange information with each other. Specifically, data received by the receiver 100 can be transferred to and stored in the computer 200 (step S17). If the two codes are not identical, the receiver 100 sends a rejection code to the computer 200 and does not interchange any data with the computer 200 (step S18).

As stated above, the embodiment allows the receiver 100 and computer 200 to access each other only when the external signal transmission device 300, independent of the computer 200, is used. This prevents a person, knowing only program software and access code to the receiver 100, from reading or writing data particular to the receiver 100 and from transferring received data. Hence, only if the signal transmission device 300 is so controlled as to be available only for persons authorized by radio businesses, e.g., salesmen selling such receivers or exclusive agents, even a person having a through knowledge of computers cannot access the receiver 100. This insures the security of the receiver 100.

Figure 4:
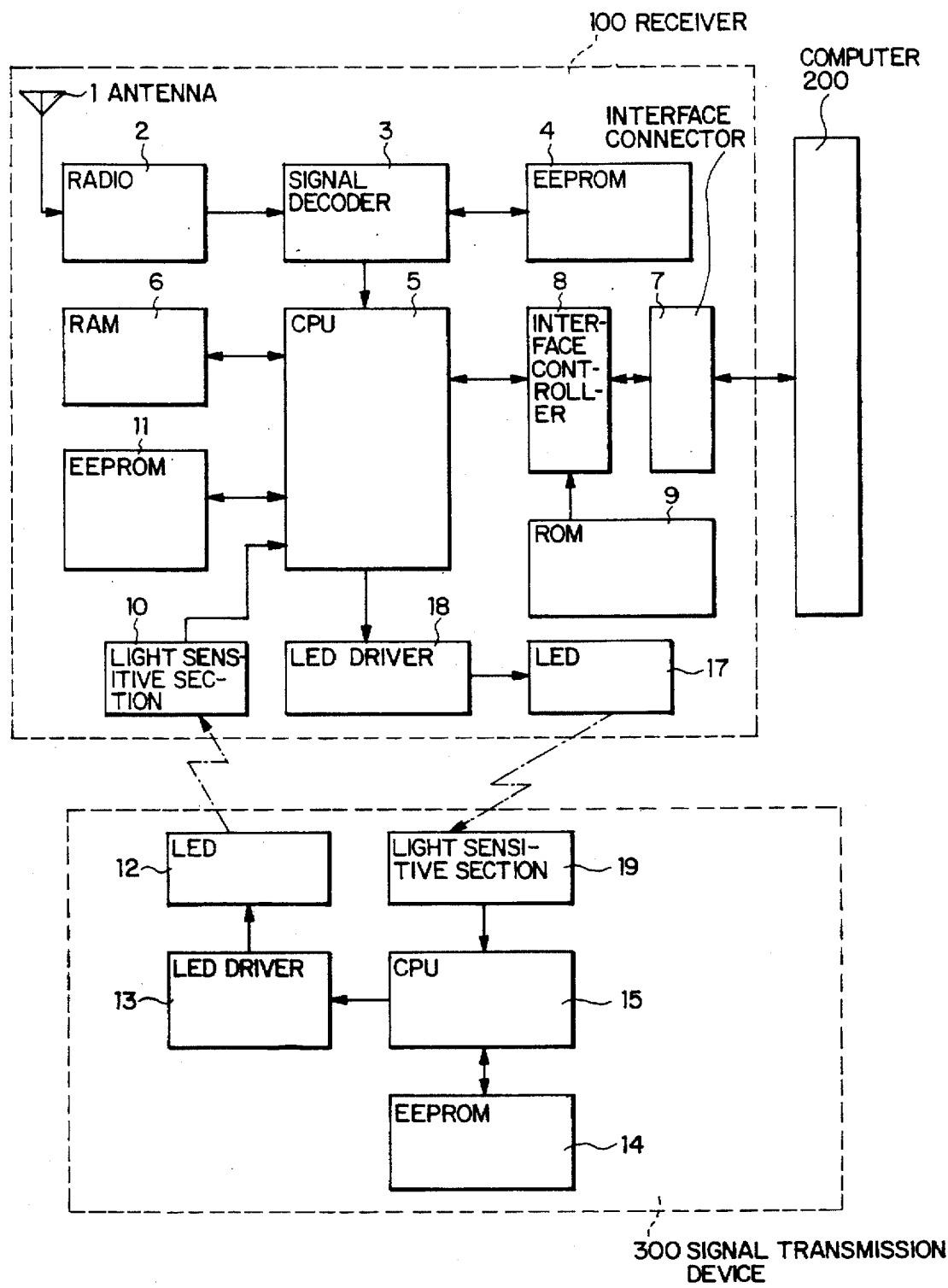
FIG. 4 is a schematic block diagram showing an alternative embodiment of the present invention.

Referring to FIG. 4, an alternative embodiment of the present invention is shown. In the figure, the same or similar constituent parts as or to the parts of the previous embodiment are designated by the same reference numerals, and a detailed description thereof will not be made in order to avoid redundancy. As shown, the receiver 100 has an LED 17 and an LED driver 18 in addition to the constituents of the receiver 100 of the previous embodiment. The LED 17, driven by the LED driver 18, sends to the external signal transmission device 300 an optical signal representing a code for requesting the transmission of an access permission code. This is contrastive to the previous embodiment in which the receiver 100 sends such a code to the computer 200. The external signal transmission device 300 includes a light-sensitive section 19 for receiving the optical signal, or request code, from the LED 17 of the receiver 100. The CPU 15 processes the optical signal incident to the light-sensitive section 19. The device 300, therefore, determines that it is requested to send an access permission code to the receiver 100.

The operation of the alternative embodiment will be described with reference to FIG. 5. The receiver 100 receives a page signal in the same manner as in the previous embodiment. When the receiver 100 and computer 200 are connected to each other in order to interchange data (steps S21 and S22), the computer 200 sends an access permission request (step S23). In response, the receiver 100 sends an optical signal from the LED 17 thereof to the external signal transmission device 300 separate from the computer 200, requesting it to send an access code (step S24). On receiving the optical signal, the signal transmission device 300 reads the access code out of the EEPROM 14 and returns it to the receiver 100 in the form of an optical signal via the LED 12 (step S25). The receiver 100 compares the access code from the signal transmission device 300 with the access permission code stored in the EEPROM 11 thereof (S26). If the received access code is identical with the access permission code (YES, step S26), the receiver 100 allows the computer 200 to access information particular to the receiver 100 (step S27). If otherwise (NO, step S26), the receiver 100 rejects an access from the computer 200 (step S28).

In this embodiment, the receiver 100 sends an access code request to the signal transmission device 300, as stated above. Hence, a person having a computer, but lacking the signal transmission device 300, is unable to know even the fact that an access code must be returned to the receiver 100 in the event of an access to the receiver 100. The embodiment, therefore, obviates improper accesses to the receiver 100 even more surely than the previous embodiment.

In the embodiments shown and described, the external signal transmission device 300 and receiver 100 interchange an access code request and an access code in the form of optical signals. Hence, the receiver 100 should only be provided with the light-sensitive section 10 or the light-sensitive section 10 and LED 17 on the casing thereof. This eliminates the need for the conventional connectors for electrical connection and thereby simplifies the structure of the receiver 100 while reducing the number of constituent parts. In the arrangement shown in FIG. 4, the LED 17 may play the role of an alerting device at the same time.

The absence of connectors on the receiver 100 secures the CPU and storages of the receiver 100 against direct electrical connection by a third person. Specifically, a third person is prevented from electrically disturbing the operation of the CPU and the codes stored in the storages with malicious intent. This further enhances the security feature of the receiver 100. It is to be noted that a greater number of access codes may be assigned to the signal transmission device 300 in order to divide the access range particular to the receiver 100 into a plurality of ranges. The LED, playing the role of light emitting means, may be replaced with a laser diode or any other suitable light emitting means, if desired.

In summary, in accordance with the present invention, a receiver receives a code from an external signal transmission device independent of a computer which reads and write information particular to the receiver. Only when the code received from the external signal transmission device is identical with a code assigned to the receiver, the receiver allows the computer to read or write information particular to the receiver. Therefore, such information cannot be written to or read out of the receiver without the external signal transmission device. This prevents a person, simply obtained program software meant for the receiver, from writing or reading the particular information in or out of the receiver, thereby securing the receiver from improper use.

A signal sent from the receiver to the external signal transmission device for requesting an access permission code and a signal returned from the latter to the former and representing the access permission code are implemented as optical signals. This makes it needless to provide the receiver with electric connectors and thereby simplifies the structure of the receiver. In addition, the absence of connectors further enhances security since a third person cannot set up direct electrical connection to a CPU and storages built in the receiver.

Various modifications will become possible for those skilled in the art after receiving the teachings of the present disclosure without departing from the scope thereof.

What is claimed is:

1. A selective calling receiver connectable to a computing device, comprising:

a first memory which stores received data when a call meant for said receiver is received;

a device which transfers, when said receiver is connected to the computing device, the received data to said computing device;

a controller which controls said transferring device to transfer the received data to the computing device when a particular code is input;

a receiving device which receives a code sent from an external signal transmitter independent of the computing device, said code being input to said controller;

a second memory which stores a specific access permission code particular to said receiver beforehand; and a requesting device which requests, when the computing device connected to said receiver requests said receiver to read or write information, said external signal transmitter to send an access permission code to said receiver;

said receiving device receiving said specific access permission code from said external signal transmitter;

said controller comparing said access permission code received from said external signal transmitter with said specific access permission code and allowing, if said access permission code and said specific access permission codes are identical, said computing device to access said receiver.

* * * * *